(12) United States Patent
Hoetter et al.

(10) Patent No.: US 11,922,269 B2
(45) Date of Patent: Mar. 5, 2024

(54) READING OUT OPTICALLY READABLE CODES

(71) Applicant: BAYER AKTIENGESELLSCHAFT, Leverkusen (DE)

(72) Inventors: Benjamin Hoetter, Cologne (DE); Gregor Fischer, Overath (DE); Klaus Ruelberg, Bornheim (DE); Dirk Schäfer, Kerpen (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 0 days.

(21) Appl. No.: 18/081,839

(22) Filed: Dec. 15, 2022

(65) Prior Publication Data
US 2023/0196044 A1    Jun. 22, 2023

(30) Foreign Application Priority Data

Dec. 22, 2021  (EP) .................... 21216812
Dec. 22, 2021  (EP) .................... 21216923
Feb. 10, 2022  (EP) .................... 22156217

(51) Int. Cl.
*G06K 7/14*   (2006.01)

(52) U.S. Cl.
CPC ......... *G06K 7/1417* (2013.01); *G06K 7/1413* (2013.01)

(58) Field of Classification Search
CPC ............ G06K 7/1417; G06K 7/1413; G06K 7/10861; G06K 7/10722; G06K 16/06037
USPC ............ 235/462.1, 462.09, 462.11, 462.07, 235/462.01
See application file for complete search history.

(56) References Cited

U.S. PATENT DOCUMENTS

| | | |
|---|---|---|
| 5,660,747 A | 8/1997 | Drouillard et al. |
| 10,481,589 B1 | 11/2019 | Drouillard |
| 2005/0082370 A1 | 4/2005 | Frantz et al. |
| 2008/0124433 A1 | 5/2008 | Yelden et al. |
| 2012/0211555 A1 | 8/2012 | Rowe |
| 2020/0175317 A1 | 6/2020 | Iwami |
| 2020/0334650 A1 | 10/2020 | Song |
| 2021/0012076 A1 | 1/2021 | Barkan et al. |
| 2021/0183088 A1* | 6/2021 | Gallo .............. G06T 7/70 |

FOREIGN PATENT DOCUMENTS

| | | |
|---|---|---|
| EP | 2281468 A1 | 2/2011 |
| EP | 3640901 A1 | 4/2020 |
| EP | 3896629 A1 | 10/2021 |
| GB | 2585938 A | 1/2021 |

(Continued)

OTHER PUBLICATIONS

Yunhua Gu et al: "QR code recognition based on image processing", Information Science and Technology (ICIST), IEEE, Mar. 2011. (4 pages).

(Continued)

*Primary Examiner* — Edwyn Labaze
(74) *Attorney, Agent, or Firm* — Harness, Dickey & Pierce, P.L.C.

(57) ABSTRACT

The present disclosure is concerned with the technical field of marking objects with optically readable codes and reading out (decoding) the codes. Subjects of the present disclosure are a method, a system and a computer program product for decoding optically readable codes introduced in surfaces of objects.

15 Claims, 3 Drawing Sheets

(56) References Cited

FOREIGN PATENT DOCUMENTS

| WO | WO-2005-102079 A1 | 11/2005 |
| WO | WO-2015117438 A1 | 8/2015 |
| WO | WO-2015117541 A1 | 8/2015 |
| WO | WO-2016118962 A1 | 7/2016 |
| WO | WO-2016118973 A1 | 7/2016 |
| WO | WO-2020119301 A1 | 6/2020 |

OTHER PUBLICATIONS

Rong Jiangpeng et al: "Radial Lens Distortion Correction Using Convolutional Neural Networks Trained with Synthesized Images", Key Laboratory of Machine Perception (Ministry of Education), 2017. (15 Pages).

Etxeberria, ED et al., "Anatomical and Morphological Characteristics of Laser Etching Depressions for Fruit Labeling" Technology & Products Reports, HortTechnology, 2006. (6 pages).

Park, Junhee et al., "Lens Distortion Correction Using Ideal Image Coordinates" IEEE Transactions ofn Consumer Electronics, vol. 55, No. 3, Aug. 2009. (5 pages).

Wang, Xiang et al., "Geometric and Photometric Correction of Projected Rectangular Pictures", CITR, Department of Computer Science, The University of Auckland, New Zealand, Apr. 2005. (7 pages).

Liu, Ming-Yu, et al., "Generative Adversarial Networks for Image and Video Synthesis: Algorithms and Applications", 2008. (22 pages).

Henry, Joyce et al., "Pix2Pix GAN for Image-to-Image Translation", Aug. 2021. (6 pages).

Sultana, Farhana, et al., "Advancements in Image Classification using Convolutional Neural Network", 2019. (9 pages).

Khan, Asifullah et al., "A survey of the recent architechtures of deep convolutional neural networks" Artificial Intelligence Review, 2020. (63 pages).

GS1 DataMatrix Guideline: Overview and technical introduction to the use of the GS1 DataMatrix, ratified Jan. 2018. (60 pages).

Pu Haitao et al: "Quick response barcode deblurring via doubly convolutional neural network", Multimedia Tools and Applications, 2009. (16 pages).

European Parliament and the Council of the European Union "Directive 2011/62/EU of the European Parliament and of the Counsel of Jun. 8, 2011, amending Directive 2001/83/EC on the Community code relating to medicinal products for human use, as regards the prevention of the entry into the legal supply chain of falsified medicinal products", Official Journal of the European Union, 2011. (14 pages).

\* cited by examiner

READING OUT OPTICALLY READABLE CODES

CROSS-REFERENCE TO RELATED APPLICATIONS

This application claims the benefit of, and priority to, European Patent Application No. 21216812.4, filed on Dec. 22, 2021, European Patent Application No. 21216923.9, filed on Dec. 22, 2021, and European Patent Application No. 22156217.6, filed on Feb. 10, 2022. The entire disclosure of each of above applications is incorporated herein by reference.

FIELD

The present disclosure is concerned with the technical field of marking objects with optically readable codes and reading out (decoding) the codes. Subjects of the present disclosure are a method, a system and a computer program product for decoding optically readable codes introduced in surfaces of objects.

BACKGROUND

This section provides background information related to the present disclosure which is not necessarily prior art.

The tracking of goods and products plays an important part in many areas of the economy. Products and goods or their packagings and/or containers are often provided with a unique identifier (e.g. a serial number) (serialization) in order to be able to track them along their supply chain and to capture incoming and outgoing products by machine.

In many cases, the identifier is applied in an optically readable form, e.g. in the form of a barcode (e.g. EAN-8 barcode) or a matrix code (e.g. QR code, data matrix code), on the products and goods or their packagings and/or containers. The barcode or matrix code often conceals a serial number that usually provides information about the kind of product or good and about the origin.

In the case of some pharmaceutical products, an individual marking of individual packs is even required. Pursuant to Article 54a para. 1 of Directive 2001/83/EC amended by what is called EU Falsified Medicines Directive 2011/62/EU (FMD), at least medicinal products subject to prescription should be marked with an individual recognition feature (referred to as: Unique Identifier) which makes it possible in particular to check the authenticity and to identify individual packs.

Plant and animal products are usually only provided with a serial code. In the case of plant and animal products, a marking is usually applied to a packaging and/or a container for example in the form of stickers.

In some cases, identifiers are also applied directly to plant or animal products. In the European Union, for example, eggs are provided with a producer code, from which the chicken husbandry, the country from which the egg originates, and the business from which the egg originates can be derived. The skin of fruit and vegetable units are increasingly also being provided with a marking (see e.g.: E. Etxeberria et al.: *Anatomical and Morphological Characteristics of Laser Etching Depressions for Fruit Labeling*, 2006, HortTechnology. 16, 10.21273/HORTTECH.16.3.0527. A direct marking of plant or animal products (without the use of stickers) conserves resources and serves for protection against falsification since an identifier introduced into a surface of a plant or animal product cannot be removed and/or exchanged as easily as a sticker or an imprint.

Consumers are showing increasing interest in the origin and the supply chain of plant and animal products. They want to know for example from where the respective product originates, whether and how it was treated (e.g. with crop protection compositions), how long transport lasted, what conditions prevailed during transport and/or the like.

EP3896629A1 proposes providing plant and animal products with a unique identifier in the form of an optically readable code. The code can be read by a consumer for example by way of the camera of his/her smartphone. On the basis of the code read out, various items of information concerning the plant or animal product can be displayed to the consumer. EP3896629A1 proposes introducing the optically readable code into a surface of the plant or animal product by means of a laser, for example. An optical code introduced into the surface of a plant or animal product has a lower contrast with respect to the surrounding tissue and is thus more difficult to read out than for example an optical code applied with a black colour on a white background, as is usually present in the case of stickers or tags. Furthermore, optical codes on different objects have a different appearance. If optically readable codes are applied to curved surfaces, for example, such as are present in the case of many fruits and types of vegetables, by means of a laser, a distortion of the codes can occur, and hampers readout. If optically readable codes are applied to smooth surfaces, reflections (e.g. as a result of ambient light) can occur on the surface during readout, and hamper readout. Surfaces of fruits and vegetables may be non-uniform; apples, for example, may have bitter pits and spots. Potatoes may have unevennesses. Such non-uniformities and unevennesses can hamper readout of codes.

SUMMARY

This section provides a general summary of the disclosure, and is not a comprehensive disclosure of its full scope or all of its features. Aspects and embodiments of the disclosure are set out in the accompanying claims.

The problem addressed is therefore that of providing means by which optically readable codes on a multiplicity of different objects, in particular on a multiplicity of plant and animal products, can be reliably read out by a consumer using simple means, such as a smartphone, for example.

This problem is solved by the subjects of the independent claims. Example embodiments are found in the dependent claims, the present description and the drawings.

A first subject of the present disclosure is a computer-implemented method comprising the steps of: receiving at least one image recording of an object, wherein the object comprises an optically readable code, wherein the optically readable code is introduced into a surface of the object; identifying the object on the basis of the at least one image recording; reading out transformation parameters for the identified object from a database; carrying out one or more transformations of the at least one image recording in accordance with the transformation parameters and generating a transformed image recording in the process, wherein at least one transformation is carried out with the aid of a trained machine learning model, wherein the trained machine learning model was trained on the basis of training data, wherein the training data for each object of a multiplicity of objects comprise i) at least one reference image recording of an optical code introduced into a surface of the object and ii) a transformed reference image recording of the optical code, wherein decoding the optical code in the transformed reference image recording generates fewer decoding errors than decoding the optical code in the reference image recording, wherein the training for each object of the multiplicity of objects comprises: (a) inputting the at least one reference image recording into the machine learning model, (b) receiving a predicted transformed reference image recording from the machine learning model, (c) calculating a deviation between the transformed reference image recording and the predicted transformed reference image recording, and (d) modifying the model parameters with regard to reducing the deviation; and decoding the optically readable code imaged in the transformed image recording.

A further subject of the present disclosure is a system comprising at least one processor, wherein the processor is configured to: to receive at least one image recording of an object, wherein the object comprises an optically readable code, wherein the optically readable code is introduced into a surface of the object; identify the object on the basis of the at least one image recording; read out transformation parameters for the identified object from a database; carry out one or more transformations of the at least one image recording in accordance with the transformation parameters and to generate a transformed image recording in the process, wherein at least one transformation is carried out with the aid of a trained machine learning model, wherein the trained machine learning model was trained on the basis of training data, wherein the training data for each object of a multiplicity of objects comprise i) at least one reference image recording of an optical code introduced into a surface of the object and ii) a transformed reference image recording of the optical code, wherein decoding the optical code in the transformed reference image recording generates fewer decoding errors than decoding the optical code in the reference image recording, wherein the training for each object of the multiplicity of objects comprises: (a) inputting the at least one reference image recording into the machine learning model, (b) receiving a predicted transformed reference image recording from the machine learning model, (c) calculating a deviation between the transformed reference image recording and the predicted transformed reference image recording, and (d) modifying the model parameters with regard to reducing the deviation; and decode the optically readable code imaged in the transformed image recording.

A further subject of the present disclosure is a computer program product comprising a data carrier on which a computer program is stored, wherein the computer program can be loaded into a main memory of a computer, where it causes the computer to execute the following steps: receiving at least one image recording of an object, wherein the object comprises an optically readable code, wherein the optically readable code is introduced into a surface of the object; identifying the object on the basis of the at least one image recording; reading out transformation parameters for the identified object from a database; carrying out one or more transformations of the at least one image recording in accordance with the transformation parameters and generating a transformed image recording in the process, wherein at least one transformation is carried out with the aid of a trained machine learning model, wherein the trained machine learning model was trained on the basis of training data, wherein the training data for each object of a multiplicity of objects comprise i) at least one reference image recording of an optical code introduced into a surface of the object and ii) a transformed reference image recording of the optical code, wherein decoding the optical code in the transformed reference image recording generates fewer decoding errors than decoding the optical code in the reference image recording, wherein the training for each object of the multiplicity of objects comprises: (a) inputting the at least one reference image recording into the machine learning model, (b) receiving a predicted transformed reference image recording from the machine learning model, (c) calculating a deviation between the transformed reference image recording and the predicted transformed reference image recording, and (d) modifying the model parameters with regard to reducing the deviation; and decoding the optically readable code imaged in the transformed image recording.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
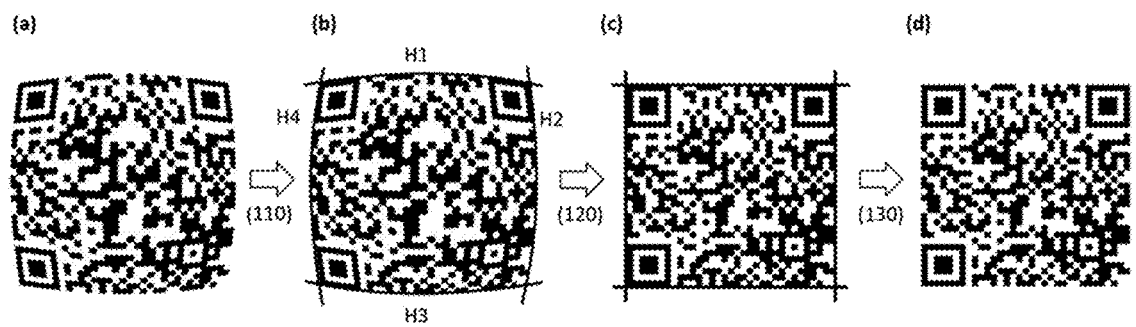
FIG. 1 illustrates example optically readable codes applied on curved surfaces.

The disclosure is explained in more detail below without distinguishing between the subjects of the disclosure (system, method, computer program product). The explanations that follow shall instead apply analogously to all subjects of the disclosure, regardless of the context (system, method, computer program product) in which they are provided.

Where steps are stated in an order in the present description or in the claims, this does not necessarily mean that the disclosure is limited to the order stated. Instead, it is conceivable that the steps are also executed in a different order or else in parallel with one another, unless one step builds on another step, which absolutely requires that the step building on the previous step be executed subsequently (which will however become clear in the individual case). The orders stated are thus example embodiments of the disclosure.

The present disclosure provides means for reading out an optically readable code. The terms "reading out" and "decoding" are used synonymously in this description.

The term "optically readable code" is understood to mean markings that can preferably be captured with the aid of a camera and be converted into alphanumeric characters, for example.

Examples of optically readable codes are barcodes, stacked codes, composite codes, matrix codes and 3D codes. Alphanumeric characters that can be captured (interpreted, read) and digitized by means of automated text recognition (referred to as optical character recognition, abbreviated to: OCR) also come under the term optically readable codes.

Optically readable codes belong to the machine-readable codes, i.e. to codes which can be captured and processed by means of a machine. In the case of optically readable codes, such a "machine" usually comprises a camera.

A camera usually comprises an image sensor and optical elements. The image sensor is a device for recording two-dimensional images from light by electrical means. This usually involves a semiconductor-based image sensor, for example a CCD (CCD=charge-coupled device) or CMOS sensor (CMOS=complementary metal oxide semiconductor). The optical elements (lenses, stops and the like) serve for maximum sharpness of imaging of the object of which a digital image recording is to be generated on the image sensor.

Optically readable codes have the advantage (e.g. over RFID transponders) that they can be read out by many consumers using simple means. In this regard, many consumers have for example a smartphone equipped with one or more cameras. By means of such a camera, it is possible to generate an image representation of the optically readable code on the image sensor of the camera. The image representation can be digitized and processed and/or stored by a computer program stored on the smartphone. Such a computer program can be configured to identify and to interpret the optically readable code, i.e. to translate it into a different form such as, for example, into a number sequence, a sequence of letters and/or the like, depending on what information is present in the form of the optically readable code.

According to the present disclosure, the optically readable code is introduced into a surface of an object. Such an object is a real, physical, tangible object. Such an object can be a natural object or an industrially produced object. Examples of objects within the meaning of the present disclosure are: Tools, machine components, circuit boards, chips, containers, packagings, jewellery, design objects, art objects, medicaments (e.g. in the form of tablets or capsules), medicament packagings and also plant and animal products.

In one example embodiment of the present disclosure, the object is a medicament (e.g. in the form of a tablet or capsule).

In a further example embodiment of the present disclosure, the object is an industrially produced product such as, a component for a machine.

In a further example embodiment of the present disclosure, the object is a plant or animal product.

A "plant product" is an individual plant or a part of a plant (e.g. a fruit) or a group of plants or a group of parts of a plant. An "animal product" is an animal or a part of an animal or a group of animals or a group of parts of an animal or an object which has been produced by an animal (such as e.g. a hen's egg). Industrially processed products such as, for example, cheese and sausage products are also intended to come under the term "plant or animal product" in this description.

The plant or animal product is usually a part of a plant or of an animal which is suitable and/or intended for consumption by a human being or an animal.

The plant product is preferably at least a part of a crop plant. The term "crop plant" is understood to mean a plant which is specifically grown as a useful plant by human intervention. In one example embodiment, the crop plant is a fruit plant or a vegetable plant. Even though fungi are not regarded biologically as plants, fungi, in particular the fruiting bodies of fungi, are also intended to come under the term plant product.

Preferably, the crop plant is one of the plants listed in the following encyclopaedia: Christopher Cumo: *Encyclopedia of Cultivated Plants: From Acacia to Zinnia*, Volumes 1 to 3, ABC-CLIO, 2013, ISBN 9781598847758.

A plant or animal product can be for example an apple, a pear, a lemon, an orange, a tangerine, a lime, a grapefruit, a kiwi, a banana, a peach, a plum, a mirabelle, an apricot, a tomato, a cabbage (a cauliflower, a white cabbage, a red cabbage, kale, Brussels sprouts or the like), a melon, a pumpkin, a cucumber, a pepper, a zucchini, an aubergine, a potato, a sweet potato, a leek, celery, a kohlrabi, a radish, a carrot, a parsnip, a scorzonera, asparagus, sugar beet, ginger root, rhubarb, a coconut, a Brazil nut, a walnut, a hazelnut, a sweet chestnut, an egg, a fish, a piece of meat, a piece of cheese, a sausage and/or the like.

The optically readable code is introduced into a surface of the object. That means that the optically readable code is not attached to the object in the form of a tag, nor is it applied to the object in the form of a sticker, nor is it applied to the object by way of a dye. Instead, a surface of the object was modified such that the surface itself carries the optically readable code.

In the case of plant products and eggs, the surface can be the skin/shell, for example.

The optically readable code can be engraved, etched, burned, impressed into the object and/or introduced into a surface of the object in some other way. Preferably, the optically readable code is introduced into the surface of the object (for example into the skin in the case of a fruit or vegetable) by means of a laser. In this case, the laser can modify (e.g. bleach and/or destroy) dye molecules in the surface of the object and/or lead locally to instances of combustion and/or destruction and/or chemical and/or physical modifications of the tissue (e.g. evaporation of water, denaturing of protein and/or the like), thus giving rise to a contrast with respect to the surrounding part (part not modified by the laser) of the surface.

The optically readable code can also be introduced into a surface of the object by means of a water jet or stream of sand.

The optically readable code can also be introduced into a surface of the object mechanically by scribing, pricking, parting, rasping, scraping, stamping and/or the like.

Details concerning the marking of objects, in particular plant or animal products, can be gathered from the prior art (see, for example, EP2281468A1).

Preferably, the optically readable code has been introduced into the surface of the object by a carbon dioxide laser ($CO_2$ laser).

At least one image recording of the object or of a part of the object is generated. The at least one image recording shows the optically readable code introduced in a surface of the object.

The term "image recording" is preferably understood to mean a two-dimensional image representation of the object or of a part thereof. The image recording is usually a digital image recording. The term "digital" means that the image recording can be processed by a machine, generally a computer system. "Processing" is understood to mean the known methods for electronic data processing (EDP).

Digital image recordings can be processed, edited and reproduced and also converted into standardized data formats, such as JPEG (graphics format of the Joint Photographic Experts Group), PNG (Portable Network Graphics) or SVG (Scalable Vector Graphics), for example, by means of computer systems and software. Digital image recordings can be visualized by means of suitable display devices, such as computer monitors, projectors and/or printers, for example.

In a digital image recording, image contents are usually represented by whole numbers and stored. In most cases this involves two-dimensional images which can be binary coded and optionally compressed. The digital image recordings usually involve raster graphics, in which the image information is stored in a uniform raster grid. Raster graphics consist of a raster arrangement of so-called picture elements (pixels) in the case of two-dimensional representations or volume elements (voxels) in the case of three-dimensional representations, to which a colour or a grey-scale value is assigned in each case. The main features of a 2D raster graphic are therefore the image size (width and height measured in pixels, also informally called image resolution) and the colour depth. A colour is usually assigned to a pixel of a digital image file. The colour coding used for a pixel is defined, inter alia, in terms of the colour space and the colour depth. The simplest case is a binary image, in which a pixel stores a black-and-white value. In the case of an image, the colour of which is defined in terms of the so-called RGB colour space (RGB stands for the primary colours red, green and blue), each pixel consists of three colour values, one colour value for the colour red, one colour value for the colour green and one colour value for the colour blue. The colour of a pixel arises from the superimposition (additive mixing) of the three colour values. The individual colour value is discretized e.g. into 256 distinguishable levels, which are called tonal values and usually range from 0 to 255. The colour nuance "0" of each colour channel is the darkest. If all three channels have the tonal value 0, the corresponding pixel appears black; if all three channels have the tonal value 255, the corresponding pixel appears white. When carrying out the present disclosure, digital image recordings are subjected to certain operations (transformations). In this case, the operations predominantly concern the pixels as so-called spatial operators as in the case of an edge detector, for example, or the tonal values of the individual pixels as in the case of colour space transformations, for example. There are a multiplicity of possible digital image formats and colour codings. For simplification, it is assumed in this description that the present images are RGB raster graphics having a specific number of pixels. However, this assumption ought not in any way be understood as limiting. It is clear to a person skilled in the art of image processing how the teaching of this description can be applied to image files which are present in other image formats and/or in which the colour values are coded differently.

The at least one image recording can also be one or more excerpts from a video sequence.

The at least one image recording is generated with the aid of one camera or a plurality of cameras. Preferably, the at least one image recording is generated by one or more cameras of a smartphone.

The use of a plurality of cameras which view an object from different directions and generate image recordings from different viewing directions has the advantage that depth information is captured. By way of example, information about curvatures of the imaged object that are present can be derived and/or gathered from such depth information.

The at least one image recording shows the optically readable code introduced into the surface of the object.

The appearance of an optically readable code introduced into a surface of an object usually differs from an optically readable code that has been printed in a black colour onto a planar white surface.

Introducing an optically readable code into a surface of an object usually leads to a marking that has a lower contrast than, for example, an optically readable code in the form of a black or coloured imprint on a white sticker. The contrast can be optimized by virtue of the possibility of individual design of the sticker or tag; by way of example, a black marking (e.g. a black barcode or a black matrix code) on a white background has a very high contrast. Such high contrasts are not usually attained by means of introducing optically readable codes into a surface of an object, particularly in the case of plant or animal products, in the case of medicaments and/or in the case of components. This can lead to difficulties when reading out the codes. Moreover, optically readable codes introduced for example into a surface of an object by means of a laser have a different appearance for different objects. In other words: optically readable codes introduced into an apple, for example, usually have a different appearance from optically readable codes introduced into a banana, a tomato, a pumpkin or a potato. The respective variety of a fruit can also influence the appearance of the optically readable code: optically readable codes in an apple of the "Granny Smith" variety have a different appearance from optically readable codes in an apple of the "Pink Lady" variety. The structure of the surface of an object, in particular of a plant or animal product, can also influence the appearance of an optically readable code: the comparatively rough surface structure of a kiwi can hamper the readout of an optically readable code in just the same way as unevennesses and spots in the skin of potatoes and apples. The surfaces of fruits, vegetables, tablets, capsules and many components usually have curvatures. If an optical code is introduced into a curved surface, a distortion of the code can occur; the code can have a pincushion or barrel distortion, for example. Such distortions can hamper the decoding of codes. The extent of a distortion is usually dependent on the degree of curvature in this case. If an optically readable code having a size of 2 cm×2 cm is introduced into an apple, the distortion is greater than if the same code is introduced into a melon. Moreover, the distortions that arise on approximately spherical products (e.g. apple, tomato, melon) are different from those on approximately cylindrical products (e.g. cucumbers). Smooth surfaces (as in the case of apples, for example) produce more reflections (e.g. as a result of ambient light) than rough surfaces (as in the case of a kiwi, for example).

The abovementioned properties of the object (unevennesses, non-uniformities, spots, curved surfaces, smooth (speculatively reflective) surfaces, colouration, texture, surface roughness and/or the like) are also referred to as disturbing factors in this description.

Disturbing factors are features of the object and/or of the optically readable code introduced into a surface of the object which lead to disturbances in the at least one image recording.

Such disturbances are for example distortions, light reflections, code elements having different colourings and/or sizes and/or the like.

Disturbing factors and disturbances can have the effect that elements of an optically readable code such as are imaged in the at least one image recording are not recognized or are misinterpreted.

Disturbing factors and disturbances can have the effect that features of the object such as is imaged in the at least one image recording are interpreted as features of an optical code even though they are not part of the optically readable code.

One or more disturbances in the at least one image recording are reduced and/or eliminated with the aid of the present disclosure. This is done with the aid of one or more transformations.

A "transformation" is a function or an operator which receives one or more images as input and generates an image as output. The transformation can ensure that an optically readable code imaged in one or more input images has fewer disturbances in the output image. A transformation can ensure for example that reflections of light on the surface of the object are reduced in the output image by comparison with the input image. A transformation can ensure for example that unevennesses and/or non-uniformities on the surface of the object appear less distinctly in the output image than in the input image. Generally, the transformation ensures that the output image generates a decoding error during the decoding of the imaged optically readable code with a lower probability than the input image.

Examples of transformations are described further below.

Disturbances can be reduced and/or eliminated by traditional image processing techniques. The correction of a distortion shall be mentioned as one example. Optically readable codes applied on curved surfaces often have distortions. This is shown schematically on the basis of an example in FIG. 1. FIG. 1 (a) shows an optically readable code. This is a QR code. The QR code has a pincushion distortion. A curved surface of the object may be the cause of the pincushion distortion. In FIG. 1 (b), four envelopes H1, H2, H3 and H4 delimiting the optically readable code on the four sides were determined (step (110)). The four envelopes enclose an area. The area within the envelopes carries the optically readable code. The envelopes can be for example arcs of a circle or portions of an ellipse or polynomials or the like. In a distortion correction, the pincushion-distorted code within the envelopes can be subjected to a transformation (step (120)) that maps the pincushion area onto a square (FIG. 1 (c)). Such corrections are described in image processing textbooks and in scientific publications on the topic (see e.g.: J. Park et al.: *Lens Distortion Correction Using Ideal Image Coordinates*, Consumer Electronics IEEE Transactions on, 55, 2009, 987-991, 10.1109/TCE.2009.5278053; X. Wang, R. Klette: *Geometric Correction of Projected Rectangular Pictures*, 2005, http://citr.auckland.ac.nz/techreports/2005/CITR-TR-167.pdf. FIG. 1 (d) shows the transformed QR code, no longer having any distortion. This code can be decoded in a further step. The probability of decoding errors occurring during decoding is reduced in the case of the code in FIG. 1 (d) by comparison with the code shown in FIG. 1 (a).

Light reflections can also be reduced and/or eliminated by traditional image processing techniques.

"Traditional" image processing techniques are understood to mean all measures and operations which are not based on the use of a machine learning model trained on the basis of reference image recordings in a learning method. Traditional image processing techniques are found in textbooks such as, for example, *"Digital Image Processing—An Algorithmic Introduction using Java"* by W. Burger and M. J. Burge, Springer-Verlag, 2016, ISBN: 9781447166849, 1447166841.

According to the disclosure, at least one transformation is carried out with the aid of a machine learning model.

Such a model can be trained, in a supervised learning method, to generate a transformed image recording from one or more image recordings.

A "machine learning model" can be understood as a computer-implemented data processing architecture. The model can receive input data and supply output data on the basis of said input data and model parameters. The model can learn a relationship between the input data and the output data by means of training. During training, the model parameters can be adapted to supply a desired output for a specific input.

During the training of such a model, the model is presented with training data from which it can learn. The trained machine learning model is the result of the training process. The training data comprise, besides input data, the correct output data (target data) that the model is intended to generate on the basis of the input data. Patterns that map the input data onto the target data are recognized during training.

In the training process, the input data of the training data are input into the model, and the model generates output data. The output data are compared with the target data (so-called ground truth data). Model parameters are altered so as to reduce the deviations between the output data and the target data to a (defined) minimum.

During training, a loss function can be used to assess the prediction quality of the model. The loss function can be chosen such that it rewards a desired relationship between output data and target data and/or punishes an undesired relationship between output data and target data. Such a relationship can be e.g. a similarity, a dissimilarity or some other relationship.

A loss function can be used to calculate a loss for a given pair comprising output data and target data. The aim of the training process can consist in altering (adapting) the parameters of the machine learning model so that the loss for all pairs of the training data set is reduced to a (defined) minimum.

A loss function can quantify e.g. the deviation between the output data of the model for specific input data and the target data. If the output data and the target data are numbers, for example, the loss function can be the absolute difference between these numbers. In this case, a high absolute value of the loss function can mean that one or more model parameters must be changed to a great extent.

In the case of output data in the form of vectors, for example, difference metrics between vectors such as the mean square error, a cosine distance, a norm of the difference vector such as a Euclidean distance, a Chebyshev distance, an Lp norm of a difference vector, a weighted norm or any other type of difference metric of two vectors can be chosen as the loss function.

In the case of higher-dimensional outputs, such as e.g. two-dimensional, three-dimensional or higher-dimensional outputs, e.g. an elementwise difference metric can be used.

Alternatively or additionally, the output data can be transformed before the calculation of a loss value, e.g. into a one-dimensional vector.

In the present case, the machine learning model can be trained to generate a transformed image recording from one or more image recordings. The training can be carried out on the basis of training data. The training data can comprise a multiplicity of reference image recordings and transformed reference image recordings. The term "multiplicity" preferably means more than 100. The term "reference image recording" serves merely to differentiate image recordings used for training a machine learning model from image recordings used during use of the trained machine learning model to optimize the image recordings with regard to disturbance-free decoding.

Each reference image recording can show an optically readable code introduced into a surface of a reference object. One or more reference image recordings serve as a set of input data for the machine learning model. For each set of input data there is a transformed reference image recording as target data. The transformed reference image recording shows the same optically readable code as the one or more reference image recordings of the input data set. Transformed reference image recordings may have been generated by one or more experts in the field of optical image processing on the basis of the reference image recordings. The one or more experts can apply one or more transformations to the reference image recordings in order to generate transformed reference image recordings with fewer disturbances. The transformed reference image recordings can make the optically readable codes appear for example more distinct and/or clearer and/or with more contrast and/or with fewer distortions and/or with fewer reflections and/or with fewer characteristic features that can lead to decoding errors than in the case of the non-transformed reference image recordings. The one or more experts can combine a plurality of reference image recordings showing the same optically readable code on the surface of the same object with one another in order to generate a transformed reference image recording. The aim of the transformations and combinations is to generate transformed reference image recordings which generate fewer decoding errors than the non-transformed reference image recordings during readout of the imaged optical codes.

The decoding error can be determined empirically. It can be for example the percentage proportion of codes that could not be (correctly) decoded. Thus, for example, if 10 out of 100 codes imaged in 100 reference image recordings could not be decoded or have generated one or more read errors, then the percentage proportion of codes that could not be correctly decoded is 10%. From the 100 reference image recordings, e.g. 100 transformed reference image recordings are generated by one or more image processing experts. The codes imaged in the transformed reference image recordings are decoded. If the experts have done their work correctly, more than 90, ideally all 100, of the 100 codes in the 100 transformed reference image recordings should be decoded correctly.

Many optically readable codes have means for error correction. The decoding error can also signify the number of corrected bits in a code.

One or more image processing experts can stipulate for the individual reference image recordings transformations which lead to an increase in the contrast of the optically readable code with respect to the surroundings thereof and/or which lead to a reduction/elimination of distortions and/or which reduce/eliminate reflections and/or reduce/eliminate the other characteristic features that can lead to decoding errors. Each of the transformations can be tested; if they do not result in the desired success, they can be discarded, refined, changed and/or extended by further transformations.

Examples of transformations are: spatial low-pass filtering, spatial high-pass filtering, sharpening, blur (e.g. Gaussian blur), unsharp masking, erosion, median filter, maximum filter, reduction of contrast range, edge detection, reduction of colour depth, greyscale level conversion, negative creation, colour corrections (colour balance, gamma correction, saturation), colour replacement, Fourier transformation, Fourier low-pass filter, Fourier high-pass filter, inverse Fourier transformation.

Some transformations can be carried out by convolution of an image recording present as raster graphics using one or more convolution matrices (referred to as: convolution kernel). The latter are usually square matrices having odd dimensions, which can have various sizes (for example 3×3, 5×5, 9×9 and/or the like). Some transformations can be represented as a linear system, wherein a discrete convolution, a linear operation, is applied. For discrete two-dimensional functions (digital images), the following calculation formula arises for the discrete convolution:

$$I^*(x, y) = \sum_{i=1}^{n} \sum_{j=1}^{n} I(x - i + a, y - 1 + a)(k(i, j)$$

where I*(x, y) represents the result pixels of the transformed image recording and I is the original image recording to which the transformation is applied. a indicates the coordinate of the centre point in the square convolution matrix and k(i,j) is an element of the convolution matrix. In the case of 3×3 convolution matrices, n=3 and a=2; in the case of 5×5 matrices, n=5 and a=3.

Transformations and sequences of transformations are listed below which, in the case of apples, for example, have the effect that the transformed reference image recording generates fewer decoding errors than the non-transformed reference image recording:

colour transformation into intensity-linear RGB signals colour transformation of the linear RGB signals into e.g. a reflection channel and/or an illumination channel and at least two colour channels for differentiating the coded and uncoded surface parts. For this purpose, the intensity-linear RGB colour signals are linearly combined among one another so as to effect the best possible differentiation between coded and uncoded surface parts.

Reflection correction by subtracting the reflection channel from the at least two colour channels (additive correction)

illumination correction by normalizing the at least two colour channels to the illumination channel (multiplicative correction)

correction of disturbances in the apple surface by detection of the disturbances and spatial interpolation from the surroundings of the imperfection unsharp masking of the illumination- and reflection-corrected image segments using a filter mask in terms of an extent, with the result that spatial inhomogeneities e.g. of the image brightness are well compensated for by the curved surface shape of the apple, and the image contrast between coded and uncoded surface parts is amplified and optimized by increasing the high-frequency image portions.

Further examples of transformations can be gathered from the numerous publications on the topic of digital image processing.

If a multiplicity of transformed reference image recordings having fewer disturbances than the original (non-transformed) reference image recordings have been generated, the training data can be used for training the machine learning model. In this case, the (non-transformed) reference image recordings are fed as input data to the model. The model is configured to generate an output image recording from one or more reference image recordings (as input data set). The output image recording is compared with a transformed reference image recording (the target data). The deviations between the output image recording and the transformed reference image recording can be quantified with a loss function.

The errors determined can be used to adapt model parameters of the machine learning model so that the errors are reduced. If the errors reach a predefined minimum, the model is trained and can be used for generating new transformed image recordings on the basis of new image recordings. In this case, the term "new" means that the corresponding image recordings were not used during the training of the model.

The machine learning model can for example be an artificial neural network or comprise such a network.

An artificial neural network comprises at least three layers of processing elements: a first layer with input neurons (nodes), an N-th layer with at least one output neuron (nodes) and N−2 inner layers, where N is a natural number and greater than 2.

The input neurons serve to receive one or more image recordings. The output neurons serve to output transformed image recordings.

The processing elements of the layers between the input neurons and the output neurons are connected to one another in a predetermined pattern with predetermined connection weights.

The training of the neural network can, for example, be carried out by means of a backpropagation method. The aim here in respect of the network is maximum reliability of mapping of given input data onto given output data. The mapping quality is described by a loss function. The goal is to minimize the loss function. In the case of the backpropagation method, an artificial neural network is taught by the alteration of the connection weights.

In the trained state, the connection weights between the processing elements contain information regarding the relationship between image recordings and transformed image recordings.

A cross-validation method can be used in order to divide the data into training and validation data sets. The training data set is used in the backpropagation training of network weights. The validation data set is used in order to check the accuracy of prediction with which the trained network can be applied to unknown data.

In one example embodiment, the machine learning model comprises a generative adversarial network (abbreviated to: GAN). Details concerning these and other artificial neural networks can be gathered from the prior art (see for example: M.-Y. Liu et al.: *Generative Adversarial Networks for Image and Video Synthesis: Algorithms and Applications*, arXiv:2008.02793).

Once the machine learning model has been trained, it can be used for generating new transformed image recordings on the basis of new image recordings.

The new image recording (or a plurality of new image recordings) are fed to the trained model and the model generates a transformed image recording.

In the transformed image recording, the optically readable code is recognizable and readable better than in the original (non-transformed) image recording (or the original image recordings in the case of a plurality of image recordings), i.e. the probability of the occurrence of a decoding error is reduced.

It is conceivable for a machine learning model to be trained to fulfil a defined task, such as, for example, contrast optimization, distortion correction, reduction or elimination of light reflections and/or the like. It is conceivable for a plurality of machine learning models to be present, which have been trained independently of one another to fulfil a defined task. It is conceivable for the machine learning models that have been trained independently of one another to be combined with one another in order to fulfil a plurality of defined tasks successively. In this case, the machine learning models can be connected in series, for example, such that the transformed image recording of one machine learning model serves as input for the directly succeeding machine learning model in the series. Preferably, the models are also trained such that the transformed image recording generated by one model serves as input for the directly succeeding model in the series.

However, it is also conceivable for one machine learning model to be trained to fulfil a plurality of defined tasks (e.g. simultaneously).

As described, a plurality of transformations of the received image recording are carried out, wherein at least one transformation is carried out with the aid of a trained machine learning model.

It is conceivable for transformations on the basis of traditional image processing techniques and transformations using a machine learning model to be combined with one another. In this case, a first step can involve carrying out one or more transformations on the basis of traditional image processing techniques followed by one or more transformations using one or more machine learning models. It is also conceivable for a first step to involve carrying out one or more transformations using one or more machine learning models followed by one or more transformations on the basis of traditional image processing techniques. The alternating use of methods of traditional image processing and the use of one or more machine learning models is also conceivable.

In one example embodiment, in a first step, one or more transformation parameters are identified on the basis of the at least one image recording. The one or more transformation parameters then stipulate what transformation(s) is (are) carried out and, in the case of a plurality of transformations, in what order they are carried out.

The transformation parameters can be determined in two steps: in a first step, that object which is imaged (at least proportionally) in the first image recording can be identified; in a second step, those transformations which are intended to be carried out, and optionally the order of the transformations, can then be read out from a data storage medium.

The object can be identified for example on the basis of characteristic properties of the object which are imaged in the first image recording. Such characteristic properties are for example the colour and/or the colour distribution, the shape, the size, the texture and/or other/further properties.

Pattern recognition methods such as are known to the person skilled in the art of image processing can be used to identify the object on the basis of imaged characteristic features.

Preferably, a trained machine learning model is used for the identification of the object. Such a model for identifying the object is also referred to as a recognition model in this description.

Such a model can be trained, in a supervised learning method, to output on the basis of the at least one image recording information indicating what object there is in the at least one image recording.

The machine learning model can be embodied (configured) as a classification model which assigns at least one image recording as input data to a specific object as output data. The model can output for example a number representing the specific object imaged in the image recording.

Such classification models are described in the prior art (see e.g. F. Sultana et al.: *Advancements in Image Classification using Convolutional Neural Network*, arXiv: 1905.03288v1 [cs.CV], 2019; A. Khan et al.: A Survey of the Recent Architectures of Deep Convolutional Neural Networks, Artificial Intelligence Review, DOI: https://doi.org/10.1007/s10462-020-09825-6).

In this description, the assignment of the at least one image recording to that object which is imaged in the first image recording is also referred to as "identifying the object". In this case, the at least one image recording can be assigned to that respective object and/or to that respective part of an object which is imaged in the at least one image recording. In the case of plant products, the at least one image recording can also be assigned to a degree of ripeness and/or to a visual appearance; in the case of bananas, for example, to a green or yellow banana; in the case of pepper, for example, to a green, yellow or red pepper; in the case of an apple, to the apple variety respectively present, and/or the like.

Identifying the object in the at least one image recording serves for determining transformation parameters. The transformation parameters indicate what transformations are carried out and, in the case of a plurality of transformations, in what order the transformations are carried out.

The transformation parameters can be stored in a data storage medium, for example in a relational database. The machine learning model can be configured and trained to output on the basis of the at least one image recording an identifier linked with the transformation parameters in the database. In other words: on the basis of an identifier representing the object imaged in the at least one image recording, transformation parameters assigned to the identifier can be determined and read out from a database.

It is also conceivable for the machine learning model to be trained to supply/output the transformation parameters itself.

In a further example embodiment, the one or more transformation parameters are determined on the basis of disturbance factors and/or disturbances. In a first step, one or more disturbance factors and/or disturbances can be identified in the at least one image recording. In a second step, it is then possible to select one or more transformations which reduce and/or eliminate disturbances on account of the disturbance factors in the at least one image recording.

It is conceivable, for example, for a first step to involve analysing whether the object imaged in the at least one image recording has a curvature, e.g. whether it is round. If a curvature (e.g. a round shape) is identified, then this is an indication that distortions can occur in the imaged optically readable code. A transformation which leads to a distortion correction can be selected in such a case. If one or more light reflections are identified in the at least one image recording, a transformation which reduces or eliminates these light reflections can be selected. If a low contrast between the optically readable code introduced into a surface of the object and the surroundings thereof is identified, or the surface of the object generally has a dark colour, then a transformation which leads to an increase in the contrast of the optically readable code with respect to the surroundings thereof can be selected. In order to recognize a "dark colour", for example, the tonal values of the image elements representing the object can be compared with one or more reference values.

The selection of a transformation can mean that a traditional image processing method is selected in order to reduce and/or remove the disturbances from the at least one image recording. However, the selection of a transformation can also mean that a machine learning model is selected which has been trained to reduce and/or remove the disturbances from the at least one image recording.

If a transformed image recording has been generated on the basis of the at least one image recording, the code imaged in the transformed image recording can be read out (decoded) in a next step. Depending on the code used, here there are already existing methods for reading out (decoding) the respective code (see e.g.: https://www.gs1.org/docs/barcodes/GS1_DataMatrix_Guideline.pdf).

The code read out (decoded) can contain information concerning the object in his surface the code is introduced.

In one example embodiment, the code read out comprises a (unique) identifier, on the basis of which a consumer can acquire further information concerning the object for example from a database. The code read out and/or information linked with the code read out can be output, i.e. displayed on a screen, printed out on a printer and/or stored in a data storage medium.

Further information concerning such a (unique) identifier and the information which can be stored with respect to the object linked with the identifier and can be displayed to a consumer is described in the patent application EP3896629A1, the content of which shall be fully incorporated by reference in this description.

The disclosure is explained in more detail below with reference to drawings, without wishing to restrict the disclosure to the features and combinations of features that are shown in the drawings. Statements made in relation to a drawing and/or a feature in a drawing are not restricted to the respective drawing, but rather are intended to be generally applicable.

Figure 2:
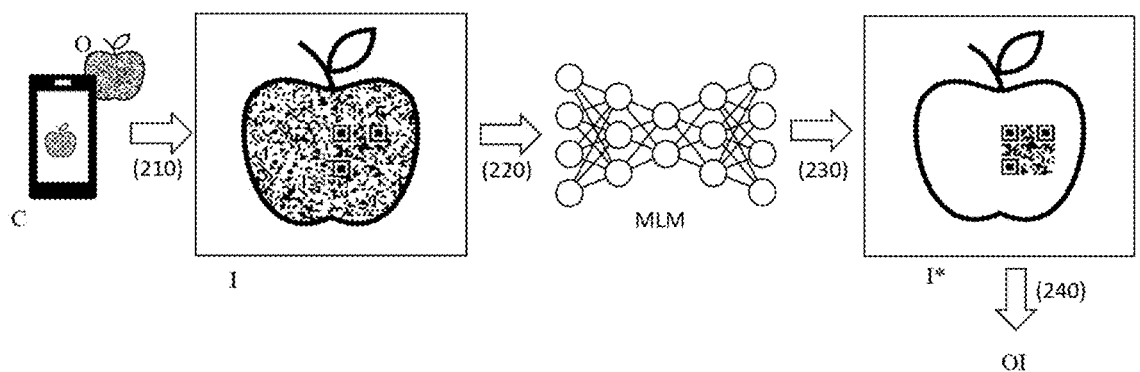
FIG. 2 illustrates schematically, and by way of example in the form of a flowchart, a readout of an optically readable code introduced into a surface of an object.

FIG. 2 shows schematically and by way of example in the form of a flowchart the readout of an optically readable code introduced into a surface of an object.

In a first step (210), a digital image recording I of the object O is generated with the aid of a camera C. In a second step (220), the digital image recording I is fed to a machine learning model MLM. The machine learning model MLM is configured and trained to generate a transformed image recording I* on the basis of the image recording I. In a third step (230), the machine learning model MLM supplies the transformed image recording I*, in which an optically readable code (in this case a QR code) introduced into a surface of the object O has a higher contrast with respect to the surroundings thereof and is thus more clearly recognizable and easier to read out than the code in the case of the non-transformed image recording I. In a fourth step (240), the optically readable code is read out and the code OI read out is provided. The code OI read out can be displayed and/or information concerning the object O, on the basis of the code OI read out, can e.g. be read out from a database and provided (e.g. communicated and displayed).

Figure 3:
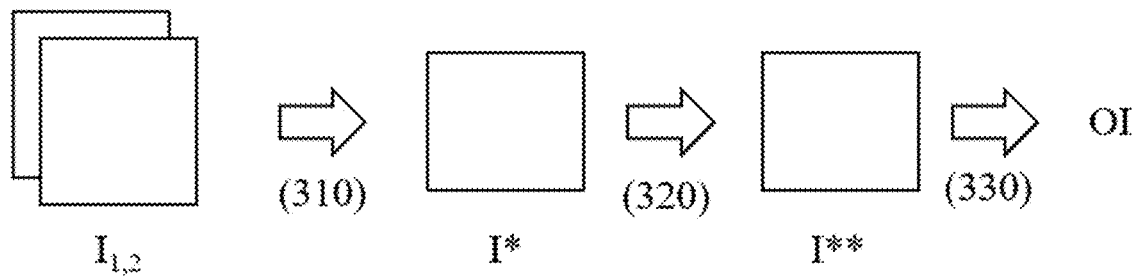
FIG. 3 shows schematically, and by way of example in the form of a flowchart, generation of a transformed image recording and the readout of an optically readable code imaged in the transformed image recording.

FIG. 3 shows schematically and by way of example in the form of a flowchart the generation of a transformed image recording and the readout of an optically readable code imaged in the transformed image recording. The starting point is at least one image recording of an object in whose surface an optically readable code is introduced. In the present example there are two image recordings $I_1$ and $I_2$; however, there can also be more or fewer. It is conceivable for the image recordings $I_{1,2}$ to have been generated from different viewing directions or, in the case of one image recording, for an optical filter to have been used (e.g. a polarization filter or a colour filter) and, in the case of the other image recording, for no filter or for a different filter to have been used. The image recordings $I_{1,2}$ are subjected to a first transformation in step (310). In the present example, the transmission generates a first transformed image recording I* from the two image recordings $I_{1,2}$. The transformed image recording I* is subjected to a second transformation in step (320). The second transformation generates a second transformed image recording I from the first transformed image recording. In step (330), the second transformed image recording I is subjected to a decoding that decodes the optically readable code imaged in the second transformed image recording. The result of the decoding is a code OI read out. According to the disclosure, at least one transformation is carried out with the aid of a machine learning model. In the present example, for example, the first transformation can be a distortion correction and/or reduction of light reflections with the aid of traditional image processing methods and the second transformation can be a contrast optimization with the aid of a machine learning model. However, it is also possible for the first transformation to be a transformation which is carried out with the aid of a machine learning model, and for the second transformation to be a transformation either by means of a further machine learning model or with the aid of traditional image processing methods.

Figure 4:
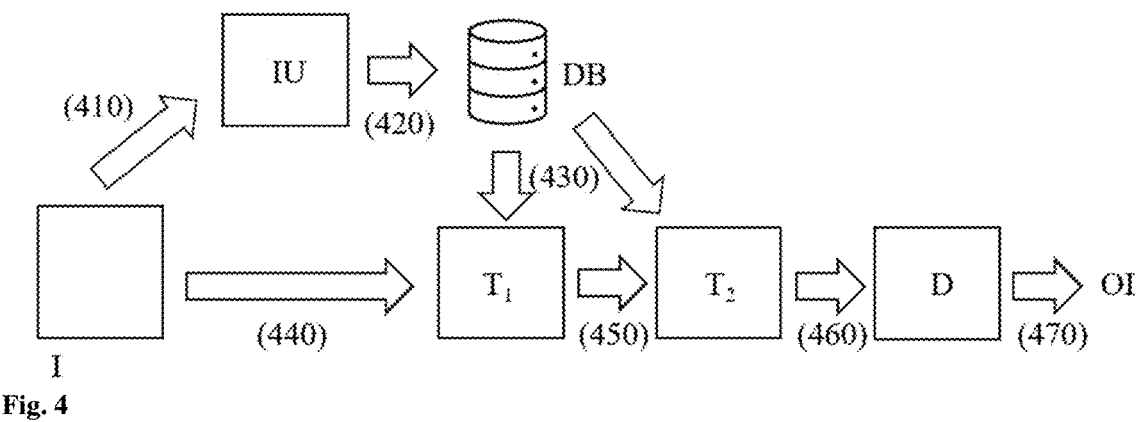
FIG. 4 shows schematically in the form of a flowchart a further example of the optimization of at least one image recording with regard to an error-free readout of an optically readable code.

FIG. 4 shows schematically in the form of a flowchart a further example of the optimization of at least one image recording with regard to an error-free readout of an optically readable code.

The starting point is at least one image recording I of an object in whose surface an optically readable code is introduced. The at least one image recording I is fed to an identification unit IU in step (410). The identification unit IU can be a recognition unit configured to identify the object imaged in the at least one image recording I. The object can be identified for example with the aid of a machine learning model (with a recognition model) configured and trained to assign the at least one image recording to the object imaged in the at least one image recording. However, the identification unit IU can also be a unit configured to recognize one or more disturbances and/or disturbance factors in the at least one image recording. Transformation parameters can be determined on the basis of the result of the analysis of the identification unit. These transformation parameters stipulate what transformation(s) is (are) carried out and, in the case of a plurality of transformations, in what order they are carried out. In the present example, the transformation parameters are stored in a data storage medium DB. The identification unit IU can thus output (step (420)) for example an identifier that identifies the object imaged in the image recording, or it can output (step (420)) an identifier that identifies one or more disturbances and/or one or more disturbance factors. On the basis of the identifier, it is then possible to determine the transformation parameters from the data storage medium (step (430)). Two transformations $T_1$ and $T_2$ arise in the present example. The at least one image recording I is fed to the first transformation $T_1$ in step (440). The at least one image recording I which is fed to the first transformation $T_1$ in step (440) need not necessarily be the same at least one image recording which was fed to the identification unit IU. It is conceivable for the at least one image recording I to comprise two image recordings, a first image recording and a second image recording, both of which show the same object, but at different points in time, for example. The first image recording can be fed to the identification unit IU in order to determine transformation parameters, and the second image recording can be fed to the first transformation $T_1$. It is conceivable, for example, for the camera used to generate the at least one image recording to be configured, continuously at a defined rate, to digitize image representations incident on the image sensor of the camera, to generate digital image recordings, and to feed these digital image recordings to an identification unit. The identification unit can communicate an identifier to a control unit, which determines transformation parameters on the basis of the identifier. The transformation parameters determined provide information about the transformation(s) (and optionally the order of transformations), which are then applied to one or more of the subsequently generated image recordings. The result of the transformation $T_1$ of the at least one image recording I is a first transformed image recording, which is fed to the second transformation $T_2$ (step (450)). The result of the second transformation $T_2$ is a second transformed image recording, which is fed to a decoder D (step (460)). The decoder D is configured to decode the optically readable code imaged in the second transformed image recording. The decoder D outputs the decoded code OI in step (470).

Figure 5:
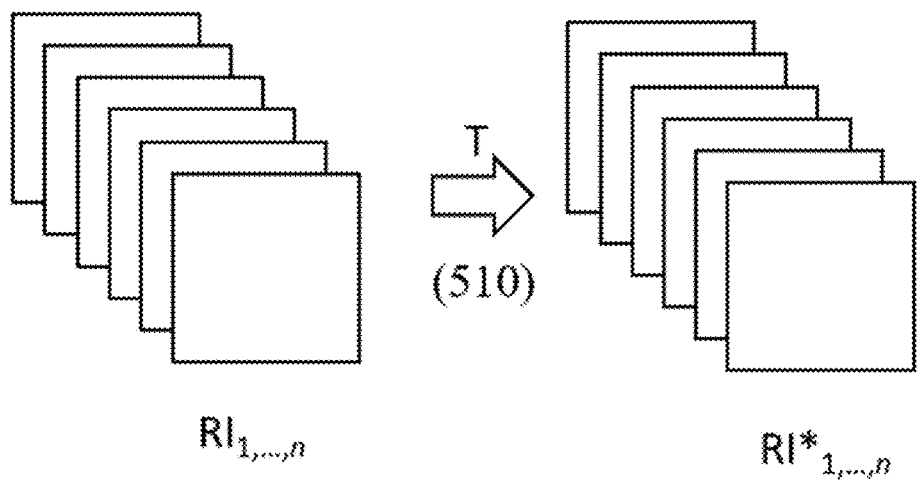
FIG. 5 shows by way of example and schematically the generation of a training data set for training a machine learning model.
Figure 6:
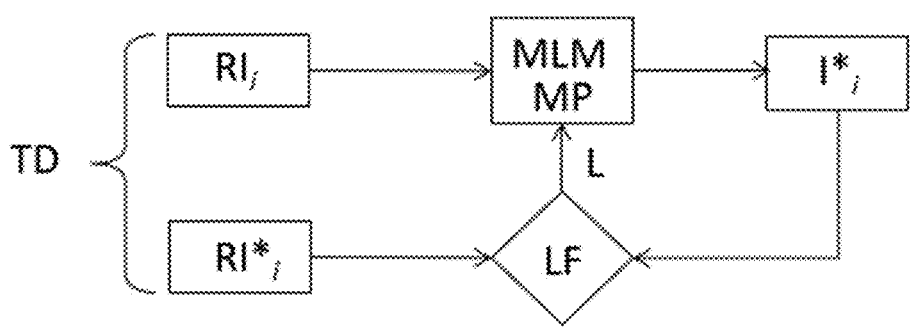
FIG. 6 illustrates training of a machine learning model using the training data set of FIG. 5.

FIG. 5 shows by way of example and schematically the generation of a training data set for training a machine learning model. On the basis of the training data set, the machine learning model can be trained to carry out one or more transformations of image recordings. The training is shown in FIG. 6.

The generation of a training data set can be a manual process carried out by one or more experts. The starting point in the present example is a number n of reference image recordings $RI_1$ to $RI_n$, where n is an integer that is preferably greater than 100. Each reference image recording shows an optical code introduced into a surface of an object. Preferably, each reference image recording shows an optically readable code introduced into a different specimen of an object. The object can be an apple, for example; in that case, each reference image recording preferably shows an optically readable code in different apple specimens.

If the reference object is always the same, such as e.g. an apple, then the training data set can be used to train a machine learning model to reduce and/or eliminate disturbances in image recordings of optically readable codes introduced in apples.

If there are different reference objects, such as, for example, different fruits (e.g. apples and pears), the training data set can be used to train a machine learning model to reduce and/or eliminate disturbances in image recordings of optically readable codes introduced in different fruits. The more different (the greater the number of variants of) the reference objects imaged in the reference image recordings, the greater the amount of training data required and the more diversely the trained machine learning model can be used. A machine learning model which has been trained only on the basis of reference image recordings of apples of a defined variety, when used for reading out codes on bananas, will achieve worse results than a model which has been trained on the basis of reference image recordings of apples of different varieties and of bananas. The optically readable code imaged in the reference image recordings can likewise be identical or different in all of the reference image recordings.

In the present example (FIG. 5), an expert generates a transformed reference image recording from a respective reference image recording. As described in this description, a plurality of reference image recordings can also be combined to form a transformed reference image recording. A transformed reference image recording is generated by the reference image recording being subjected to one or more transformations. What transformation(s) is/are carried out, and in what order the transformations are carried out in the case of a plurality of transformations, will be stipulated by the expert on the basis of his/her expert knowledge. The aim of the transformation(s) is to generate from at least one reference image recording a transformed reference image recording in which there are fewer disturbances and the probability of the occurrence of decoding errors is thus reduced.

FIG. 6 shows schematically and by way of example a step during the training of a machine learning model. The training is effected on the basis of a training data set. The training data set comprises a multiplicity of reference image recordings and transformed reference image recordings. The reference image recordings and transformed reference image recordings form pairs, i.e. for each reference image recording there is a transformed reference image recording. If a plurality of reference image recordings are combined to form a transformed reference image recording, there are tuples, wherein each tuple comprises a transformed reference image recording and a number of reference recordings which were used for generating the transformed reference image recording. In the present example, pairs are present for simplification.

One such pair consisting of a reference image recording $RI_i$ and a transformed reference image recording $RI^*_i$ is shown in the present example. The reference image recording $RI_i$ is fed to the machine learning model MLM. The machine learning model MLM is configured to generate a transformed image recording $I^*_i$. The transformed image recording $I^*_i$ is compared with the transformed reference image recording $RI^*_i$. A loss function LF is used to calculate a loss L quantifying the deviations of the transformed image recording $I^*_i$ from the transformed reference image recording $RI^*_i$. The loss L can be used in a backpropagation method, for example, to modify model parameters MP of the machine learning model so that the loss is reduced to a (defined) minimum. The process described is repeated for a multiplicity of reference image recordings and transformed reference image recordings until the losses obtained are reduced to a (defined) minimum. Once the machine learning model has been trained, then it can be used to generate transformed image recordings for new image recordings, where the term "new" means that the corresponding image recordings have not already been used in the training.

Figure 7:
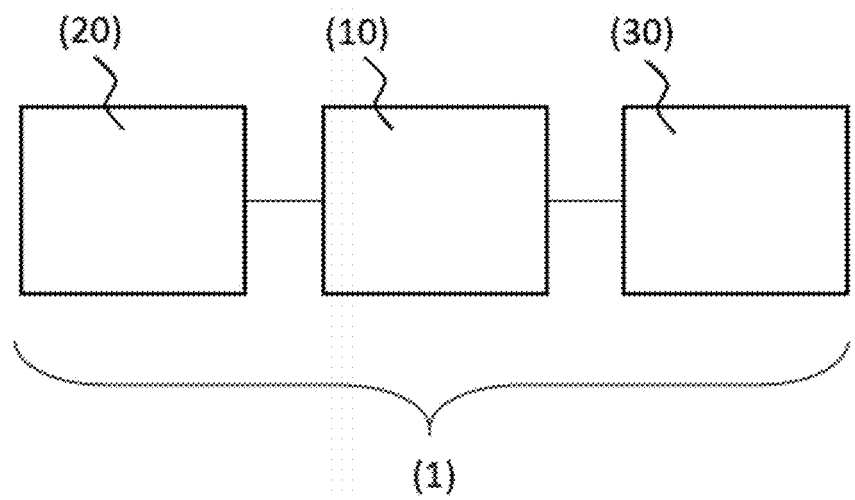
FIG. 7 shows by way of example and schematically a system according to the present disclosure.

FIG. 7 shows by way of example and schematically a system according to the disclosure.

The system (1) comprises a computer system (10), a camera (20) and one or more data storage media (30). Image recordings of objects can be generated with the aid of the camera (20). The camera (20) is connected to the computer system (10), such that the image recordings generated can be transmitted to the computer system (10). The camera (20) can be connected to the computer system (10) via a cable connection and/or via a radio connection. A connection via one or more networks is also conceivable. It is furthermore conceivable for the camera (20) to be an integral part of the computer system (10), as is the case for example for present-day smartphones and tablet computers.

The computer system (10) is configured (for example by means of a computer program) to receive one or more image recordings (from the camera or from a data storage medium), to generate a transformed image recording, to decode the optical code in the transformed image recording and to output the decoded code and/or to provide information linked with the decoded code.

Image recordings, models, model parameters, computer programs, transformation parameters and/or other/further information can be stored in the data storage medium (30). The data storage medium (30) can be connected to the computer system (10) via a cable connection and/or via a radio connection. A connection via one or more networks is also conceivable. It is furthermore conceivable for the data storage medium (30) to be an integral part of the computer system (10). It is furthermore conceivable for a plurality of data storage media to be present.

Figure 8:
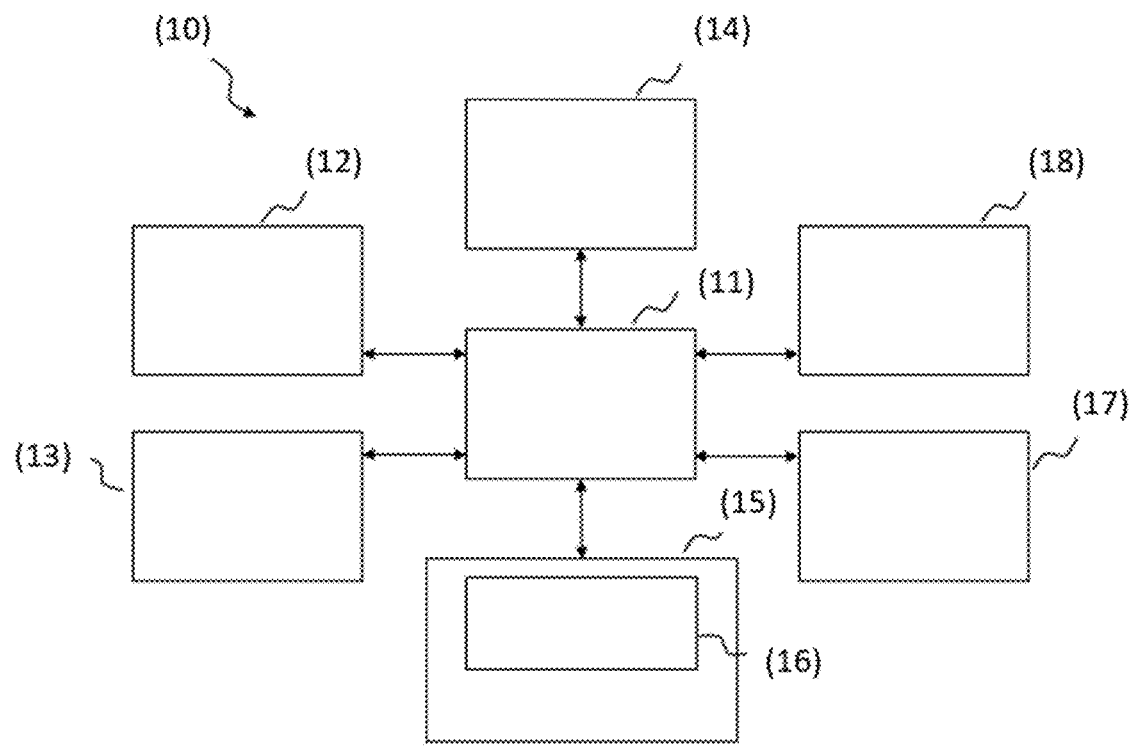
FIG. 8 shows an example computer system of the present disclosure.

FIG. 8 schematic shows a computer system (10). Such a computer system (10) can comprise one or more stationary or portable electronic devices. The computer system (10) can comprise one or more components, such as e.g. a processing unit (11) connected to a storage medium (15).

The processing unit (11) can comprise one or more processors alone or in combination with one or more storage media. The processing unit (11) can involve customary computer hardware that is able to process information such as e.g. digital image recordings, computer programs and/or other digital information. The processing unit (11) usually consists of an arrangement of electronic circuits, some of which can be embodied as an integrated circuit or as a plurality of integrated circuits connected to one another (an integrated circuit is sometimes also referred to as a "chip"). The processing unit (11) can be configured to execute computer programs which can be stored in a main memory of the processing unit (11) or in the storage medium (15) of the same or of a different computer system.

The storage medium (15) can be customary computer hardware that is able to store information such as e.g. digital image recordings, data, computer programs and/or other digital information either temporarily and/or permanently. The storage medium (15) can comprise a volatile and/or non-volatile storage medium and can be fixedly built in or removable. Examples of suitable storage media are RAM (Random Access Memory), ROM (Read-Only Memory), a hard disk, a flash memory, an exchangeable computer floppy disk, an optical disc, a magnetic tape or a combination of the aforementioned. The optical discs can include compact discs with read-only memory (CD-ROM), compact discs with a read/write function (CD-R/W), DVDs, Blu-ray discs and the like.

In addition to the storage medium (15), the processing unit (11) can also be connected to one or more interfaces (12, 13, 14, 17, 18) in order to display, to transmit and/or to receive information. The interfaces can comprise one or more communication interfaces (17, 18) and/or one or more user interfaces (12, 13, 14). The one or more communication interfaces can be configured such that they transmit and/or receive information, e.g. to and/or from a camera, other computers, networks, data storage media or the like. The one or more communication interfaces can be configured such that they transmit and/or receive information via physical (wired) and/or wireless communication connections. The one or more communication interfaces can contain one or more interfaces for connection to a network, e.g. using technologies such as mobile telephone, Wi-Fi, satellite, cable, DSL, optical fibre and/or the like. In some examples, the one or more communication interfaces can comprise one or more close-range communication interfaces configured such that they connect devices with close-range communication technologies such as NFC, RFID, Bluetooth, Bluetooth LE, ZigBee, infrared (e.g. IrDA) or the like.

The user interfaces (12, 13, 14) can comprise a display (14). A display (14) can be configured such that it displays information to a user. Suitable examples thereof are a liquid crystal display (LCD), a light-emitting diode display (LED), a plasma display panel (PDP) or the like. The user input interface(s) (12, 13) can be wired or wireless and can be configured so as to receive information from a user into the computer system (10), e.g. for processing, storage and/or display. Suitable examples of user input interfaces are a microphone, an image or video recording device (e.g. a camera), a keyboard or a keypad, a joystick, a touch-sensitive surface (separate from a touchscreen or integrated therein) or the like. In some examples, the user interfaces can contain an automatic identification and data capture technology (AIDC) for machine-readable information. That can include barcodes, radio-frequency identification (RFID), magnetic strips, optical character recognition (OCR), integrated circuit cards (ICC) and the like. The user interfaces can furthermore comprise one or more interfaces for communication with peripherals such as printers and the like.

One or more computer programs (16) can be stored in the storage medium (15) and can be executed by the processing unit (11), which is thereby programmed to fulfil the functions described in this description. The fetching, loading and execution of instructions of the computer program (16) can be effected sequentially, such that a respective instruction is fetched, loaded and executed. However, the fetching, loading and/or execution can also be effected in parallel.

The system according to the disclosure can be embodied as a laptop, notebook, netbook, tablet PC and/or handheld device (e.g. smartphone). Preferably, the system according to the disclosure comprises a camera.

With that said, and as described, it should be appreciated that one or more aspects of the present disclosure transform a general-purpose computing device (or computer or computer system) into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, and as described, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising the steps of:
   receiving at least one image recording of an object, wherein the object comprises an optically readable code, wherein the optically readable code is introduced into a surface of the object;
   identifying the object on the basis of the at least one image recording;
   reading out transformation parameters for the identified object from a database;
   carrying out one or more transformations of the at least one image recording in accordance with the transformation parameters and generating a transformed image recording in the process, wherein at least one transformation is carried out with the aid of a trained machine learning model, wherein the trained machine learning model was trained on the basis of training data, wherein the training data for each object of a multiplicity of objects comprise i) at least one reference image recording of an optical code introduced into a surface of the object and ii) a transformed reference image recording of the optical code, wherein decoding the optical code in the transformed reference image recording generates fewer decoding errors than decoding the optical code in the reference image recording, wherein the training for each object of the multiplicity of objects comprises:
inputting the at least one reference image recording into the machine learning model;
receiving a predicted transformed reference image recording from the machine learning model;
calculating a deviation between the transformed reference image recording and the predicted transformed reference image recording;
modifying the model parameters with regard to reducing the deviation; and
decoding the optically readable code imaged in the transformed image recording.

2. The method according to claim 1, wherein the object is a plant or animal product.

3. The method according to claim 1, wherein the object is a medicament in the form of a tablet or capsule.

4. The method according to claim 1, wherein the object is a tool, a machine component, a circuit board, a semiconductor chip, a container, a packaging, a piece of jewelry, a design object or an art object.

5. The method according to claim 1, wherein for each object of the multiplicity of objects the transformed reference image recording was generated by applying one or more transformations to the at least one reference image recording, wherein the one or more transformations were chosen such that reading out the optically readable code in the transformed reference image recording leads to fewer decoding errors than reading out the optically readable code in the at least one reference image recording.

6. The method according to claim 5, wherein the one or more transformations were determined empirically.

7. The method according to claim 1, wherein the optically readable code has been introduced into the surface of the object by means of a laser.

8. The method according to claim 1, further comprising the step of:
outputting the decoded optically readable code and/or information linked with the decoded code.

9. The method according to claim 1, wherein identifying the object shown in the at least one image recording is effected by means of a machine learning model, wherein the machine learning model is trained to assign an image recording to the object shown in the at least one image recording.

10. The method according to claim 1, wherein the optically readable code is a matrix code.

11. The method according to claim 1, wherein the transformations have one or more of the following effects:
distortion correction;
reducing and/or eliminating light reflections;
increasing the contrast between the optically readable code and its surroundings.

12. The method according to claim 1, wherein the machine learning model is an artificial neural network or comprises such a network.

13. The method according to claim 1, wherein a portion of the transformations is effected by means of image processing methods that are not based on the use of a machine learning model.

14. A system comprising at least one processor, wherein the processor is configured to:
receive at least one image recording of an object, wherein the object comprises an optically readable code, wherein the optically readable code is introduced into a surface of the object;
identify the object on the basis of the at least one image recording;
read out transformation parameters for the identified object from a database;
carry out one or more transformations of the at least one image recording in accordance with the transformation parameters and to generate a transformed image recording in the process, wherein at least one transformation is carried out with the aid of a trained machine learning model, wherein the trained machine learning model was trained on the basis of training data, wherein the training data for each object of a multiplicity of objects comprise i) at least one reference image recording of an optical code introduced into a surface of the object and ii) a transformed reference image recording of the optical code, wherein decoding the optical code in the transformed reference image recording generates fewer decoding errors than decoding the optical code in the reference image recording, wherein the training for each object of the multiplicity of objects comprises:
inputting the at least one reference image recording into the machine learning model;
receiving a predicted transformed reference image recording from the machine learning model;
calculating a deviation between the transformed reference image recording and the predicted transformed reference image recording;
modifying the model parameters with regard to reducing the deviation; and
decode the optically readable code imaged in the transformed image recording.

15. A computer program product comprising a non-transitory data carrier on which a computer program is stored, wherein the computer program can be loaded into a main memory of a computer, where it causes the computer to execute the following steps:
receiving at least one image recording of an object, wherein the object comprises an optically readable code, wherein the optically readable code is introduced into a surface of the object;
identifying the object on the basis of the at least one image recording;
reading out transformation parameters for the identified object from a database;
carrying out one or more transformations of the at least one image recording in accordance with the transformation parameters and generating a transformed image recording in the process, wherein at least one transformation is carried out with the aid of a trained machine learning model, wherein the trained machine learning model was trained on the basis of training data, wherein the training data for each object of a multiplicity of objects comprise i) at least one reference image recording of an optical code introduced into a surface of the object and ii) a transformed reference image recording of the optical code, wherein decoding the optical code in the transformed reference image recording generates fewer decoding errors than decoding the optical code in the reference image recording, wherein the training for each object of the multiplicity of objects comprises:

inputting the at least one reference image recording into the machine learning model;

receiving a predicted transformed reference image recording from the machine learning model;

calculating a deviation between the transformed reference image recording and the predicted transformed reference image recording; and modifying the model parameters with regard to reducing the deviation; and decoding the optically readable code imaged in the transformed image recording.

* * * * *